(12) United States Patent
Hoke

(10) Patent No.: US 12,382,211 B2
(45) Date of Patent: Aug. 5, 2025

(54) METHOD FOR MAKING A CUSTOMIZED EARPIECE

(71) Applicant: Wavs Custom, Inc., Greenville, SC (US)

(72) Inventor: Charles Richard Hoke, Simpsonville, SC (US)

( * ) Notice: Subject to any disclaimer, the term of this patent is extended or adjusted under 35 U.S.C. 154(b) by 620 days.

(21) Appl. No.: 17/230,170

(22) Filed: Apr. 14, 2021

(65) Prior Publication Data

US 2021/0321189 A1     Oct. 14, 2021

Related U.S. Application Data

(60) Provisional application No. 63/009,526, filed on Apr. 14, 2020.

(51) Int. Cl.
*H04R 1/10*     (2006.01)
*G06V 40/16*    (2022.01)

(52) U.S. Cl.
CPC ......... *H04R 1/1058* (2013.01); *G06V 40/166* (2022.01); *G06V 40/172* (2022.01); *H04R 1/1016* (2013.01); *H04R 2201/105* (2013.01)

(58) Field of Classification Search
CPC .... G06V 20/64; G06V 40/166; G06V 40/171; G06V 40/172; H04R 1/1016; H04R 1/1058; H04R 2201/105; H04R 2225/77; H04R 25/652; H04R 25/658

See application file for complete search history.

(56) References Cited

U.S. PATENT DOCUMENTS

| | | | |
|---|---|---|---|
| 9,420,152 B2 | 8/2016 | Eromäki | |
| 2008/0178088 A1* | 7/2008 | Goldstein | G06Q 30/02 715/727 |
| 2009/0041287 A1* | 2/2009 | Quinlisk | H04R 1/1058 381/380 |
| 2011/0081946 A1 | 4/2011 | Singh | |

(Continued)

OTHER PUBLICATIONS

Roual Free london, New ear scanner means a perfect fit for patients, Mar. 7, 2019, p. 1-2, (Year: 2019).*

(Continued)

*Primary Examiner* — Kidest Bahta
(74) *Attorney, Agent, or Firm* — Kim and Lahey Law Firm, LLC; Douglas W. Kim

(57) ABSTRACT

A method for making a customized earpiece includes creating a unique identifier associated with a user, scanning an ear of the user with an electronic device that includes at least one camera system that configured to perform three dimensional mapping image scans, associating the unique identifier with one or more scans obtained via the electronic device, receiving, at a database, the one or more scans via transmission from the electronic device, receiving, at the database, one or more earpiece parameters via transmission from the electronic device, forming, via a three-dimensional printer, a mold having an internal configuration corresponding to the one or more scans and the one or more earpiece parameters. The mold can then be utilized to create a custom-fit earpiece that includes customized internal components and other features that match the earpiece parameters provided by the user. A system utilizing the above method is also included.

10 Claims, 2 Drawing Sheets

(56) References Cited

U.S. PATENT DOCUMENTS

| | | | | |
|---|---|---|---|---|
| 2011/0164128 A1* | 7/2011 | Burgett | ............... | A61B 5/1079 |
| | | | | 348/E7.085 |
| 2014/0120319 A1* | 5/2014 | Joseph | ................ | H04N 13/254 |
| | | | | 348/46 |
| 2014/0168804 A1 | 6/2014 | Rothschild | | |
| 2015/0030196 A1* | 1/2015 | Basseas | ............. | H04L 61/2514 |
| | | | | 381/380 |
| 2015/0170416 A1* | 6/2015 | McGregor | ............. | G06T 19/20 |
| | | | | 345/420 |
| 2015/0382123 A1* | 12/2015 | Jobani | ................. | H04R 1/1016 |
| | | | | 700/98 |
| 2016/0219199 A1 | 7/2016 | Streuter et al. | | |
| 2017/0064168 A1 | 3/2017 | Roman | | |
| 2019/0364226 A1* | 11/2019 | Zheng | ................... | G06V 40/40 |
| 2019/0393918 A1* | 12/2019 | Han | ..................... | G06V 10/143 |
| 2020/0288070 A1* | 9/2020 | Siala | ...................... | G01S 17/89 |

OTHER PUBLICATIONS https://eargasm.com/products/eargasm-headphones Eargasm Custom In-Ear Headphones Apr. 7, 2021.

* cited by examiner

METHOD FOR MAKING A CUSTOMIZED EARPIECE

CROSS REFERENCE TO RELATED APPLICATIONS

This application claims the benefit of U.S. Provisional Patent Application No. 63/009,526 filed on Apr. 14, 2020. The above identified patent application is herein incorporated by reference in its entirety to provide continuity of disclosure.

BACKGROUND OF THE INVENTION

The present invention relates to methods for making customized in-ear equipment. More particularly, the present invention provides a method for making a custom-fit molded earpiece that can be customized to provide hearing protection and in-ear audio speakers for the user.

In-ear equipment including ear buds and earplugs are commonly used items. Many activities require proper hearing protection that fits within the ear in order to protect the wearer from inner ear damage or hearing loss. Currently, the main two styles of ear protection are foam ear plugs that are placed within one's ear or larger earmuffs. Both current forms of hear protection have drawbacks. The large earmuffs tend to be bulky, difficult to properly wear, and unsightly. Their large size and bulk leads to them being difficult to wear during various activities. Even modern ear protection devices having systems for amplifying quieter sounds while blocking louder sounds have this issue of being difficult to transport and wear comfortably, due to their added size and weight. In-ear foam earplugs have their own drawbacks. Many are typically a single size. While some are marketed to mold to the shape of the ear, the "one size fits all" nature of the earplug means that some user's will have difficult fitting them to their ear, as the shape and size of the ear opening can vary greatly between individuals. These foam ear plugs tend to be difficult to keep in place and tend to fall from one's ears if not constantly adjusted. Due to the above issues, some individuals will forgo using any ear protection, which can lead to hearing loss or other damage in some situations.

Another in-ear device is an earbud having a speaker that is operably connected to an audio source via a wired or wireless connection. The earbud is a common means for listening to audio that many individuals prefer over bulkier headphones that fit over the ears. However, these earbuds are also typically a single-sized item that cannot adjust to different sized ears. These earbuds often fall from the wearer's ears, becoming lost or damaged due to the poor, non-adjustable fit. Some earbuds include tips that can be attached and detached to change the size of the earbud, but these tips are often easy to misplace and difficult to secure to the earbud.

In order to address the above concerns, the present invention provides a method for making customized earpieces. The user can utilize an electronic device having the appropriate camera to scan and image their own ears. The resulting data can be utilized to make a custom-fit earpiece molded to perfectly fit the user's ears. The earpieces can be further customized to have various properties or internal components, such as speaker drivers, for example.

In light of the disadvantages of earpieces and other related devices in the known art, it is submitted that the present invention substantially diverges in design elements from the known art and consequently it is clear that there is a need in the art for an improvement to existing earbud devices with regard to user customization. In this regard, the present invention substantially fulfills these needs.

SUMMARY OF THE INVENTION

In view of the foregoing disadvantages inherent in the known types of earpieces now present in the prior art, the present invention provides a method for making a customized earpiece that can be utilized to form custom fitting earpieces with customized interior components.

The method for making a customized earpiece includes creating a unique identifier associated with a user, scanning an ear of the user with an electronic device that includes at least one camera system that configured to perform three dimensional mapping image scans, associating the unique identifier with one or more scans obtained via the electronic device, receiving, at a database, the one or more scans via transmission from the electronic device, receiving, at the database, one or more earpiece parameters via transmission from the electronic device, and forming, via a three-dimensional printer, a mold having an internal configuration corresponding to the one or more scans and the one or more earpiece parameters.

Other objects, features and advantages of the present invention will become apparent from the following detailed description taken in conjunction with the accompanying drawings.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
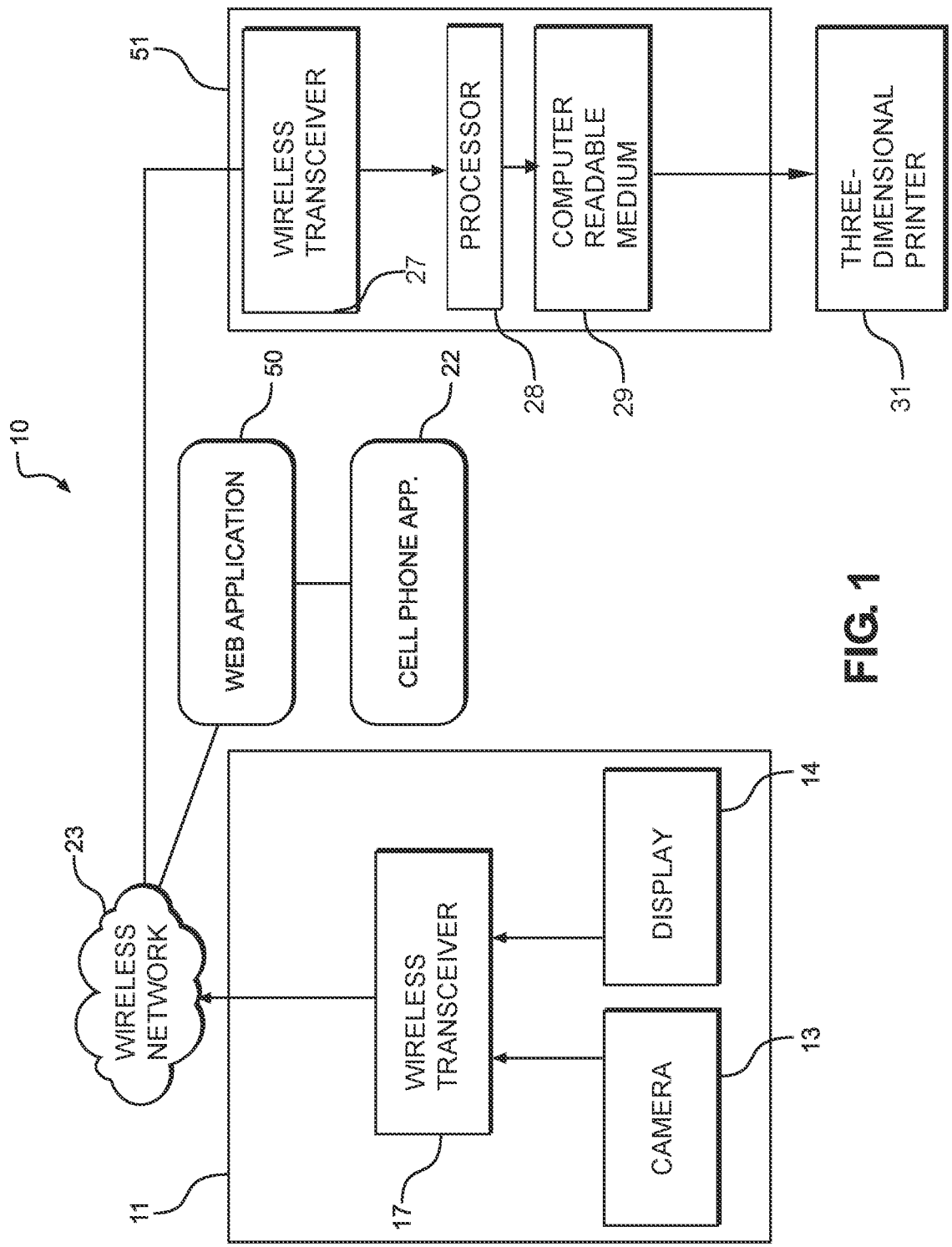
FIG. 1 shows a schematic diagram of the components of various systems utilized in the method for making a customized earpiece.

Reference is made herein to the attached drawings. Like reference numerals are used throughout the drawings to depict like or similar elements of the method for making a customized earpiece. For the purposes of presenting a brief and clear description of the present invention, the preferred embodiment will be discussed as used for providing a method for making a customized earpiece that includes a size determined by a three-dimensional scan of the user's ear and that includes interior components selected by the user. The figures are intended for representative purposes only and should not be considered to be limiting in any respect.

According to some embodiments, the operations, techniques, and/or components described herein can be implemented as (i) a special-purpose computing device having specialized hardware and a logic hardwired into the computing device to persistently perform the disclosed operations and/or techniques or (ii) a logic that is implementable on an electronic device having a general purpose hardware processor to execute the logic and a computer-readable medium, e.g. a memory, wherein implementation of the logic by the processor on the electronic device provides the electronic device with the function of a special-purpose computing device.

As referred to herein, the term "electronic device" refers to any computing device that includes at least a display screen and an input mechanism. The computing devices can be hard-wired to perform the operations, techniques, and/or components described herein, or can include digital electronic devices such as one or more application-specific integrated circuits (ASICs) or field programmable gate arrays (FPGAs) that are persistently programmed to perform the operations, techniques and/or components described herein, or can include one or more general purpose hardware processors programmed to perform such features of the present disclosure pursuant to program instructions in firmware, memory, other storage, or a combination. Such computing devices can also combine custom hard-wired logic, ASICs, or FPGAs with custom programming to accomplish the technique and other features of the present disclosure. The computing devices can be desktop computer systems, laptops, cell phones, tablets, networking devices, or any other device that incorporates hard-wired and/or program logic to implement the techniques and other features of the present disclosure.

In the interests of economy, the present disclosure refers to "a computer-readable medium," "a processor," and so on. However, this should not be read as limiting in any way as the present disclosure contemplates embodiments of the present invention utilizing "one or more computer-readable media," "one or more processors," and so on. Unless specifically limited to a single unit, "a" is intended to be equivalent to "one or more" throughout the present disclosure.

As used herein, the term "earpiece" refers to any in-ear type device, including but not limited to earbuds, earphones, in-ear monitors, earplugs, and any other similar device. The present invention provides for the creation of molds for any suitable "earpiece" or in-ear type device as desired.

Referring now to FIG. 1, there is shown a schematic diagram of the components of various systems utilized in the method for making a customized earpiece. The system is utilized in concert to perform a method for making a customized earpiece. The system includes an electronic device 11 comprising at least a camera 13, a display 14, and a wireless transceiver 17. In one embodiment, the electronic device 11 is a mobile phone, such as a smartphone, for example. The camera 13 of the electronic device is configured to record an image to generate a three-dimensional point map of an object within the recorded area. The electronic device 11 includes internal processors and software that can generate the point map from the recorded image. Some commercial embodiments of these types of camera systems include "Face ID" and "TrueDepth 3D". These systems typically include a dot projector that projects a grid of small infrared dots onto a user's face, a flood illuminator that shines infrared light at the face, and an infrared camera which takes an infrared picture of an object, reads the resulting pattern and generates a three-dimensional point map. The three-dimensional point map determines the ultimate size and appearance of an earpiece mold created by the system.

The wireless transceiver 17 is in wireless communication with a wireless network 23, such as the internet, for example. A database 51 includes its own wireless transceiver 27 that is also in wireless communication with the wireless network 23, such that the database 51 can wirelessly receive information from the electronic device 11. The system may also be accessible via cell phone applications 22 or web applications 50. The web applications 50 can be accessible via the electronic device's web browser and the cell phone applications can be installed directly on the electronic device 11.

The database 51 includes a processor 28 and a non-transitory computer readable medium operably connected to the processor 29, such as a memory, for example. A logic is stored on the non-transitory computer readable medium that, when executed by the processor, performs the method for making a customizable earbud. The method includes receiving, via the wireless transceiver of the electronic device, a three-dimensional point map of an ear recorded by the one or more cameras of the electronic device, wherein the three-dimensional point map includes a unique identifier for matching the map to a particular user of the electronic device. The unique identifier can be in the form of a user profile or user ID number provided to the user from the database or via the web or cell phone application. The three-dimensional point map is received via a scan that is detailed in the discussion of FIG. 2 below.

The method further includes receiving, via the wireless transceiver of the electronic device, one or more earpiece parameters. The user will have the ability to customize the components of the earpiece. For example, the user may select particular types and sizes of speaker drivers. The users may also select particular materials for their earpiece. This allows users to customize the exact functional components to suit their needs.

The database logic is further configured to calculating a mold size as determined by the dimensions of the three-dimensional point map and the one or more earpiece parameters. For example, mold sizes will vary for different sizes of ears and for different sizes of included speaker drivers. The mold size determination is embodied in an instruction file that is readable by a three-dimensional printer 31. The system accommodates various types and styles of printing devices that are capable of making a three-dimensional mold based on programmed instructions. In this way, the system can provide the specific instruction file to the three-dimensional printer, which then prints the mold for the earpiece. The mold can then be utilized to create the actual working earpiece, including specific materials and components as selected by the user.

Figure 2:
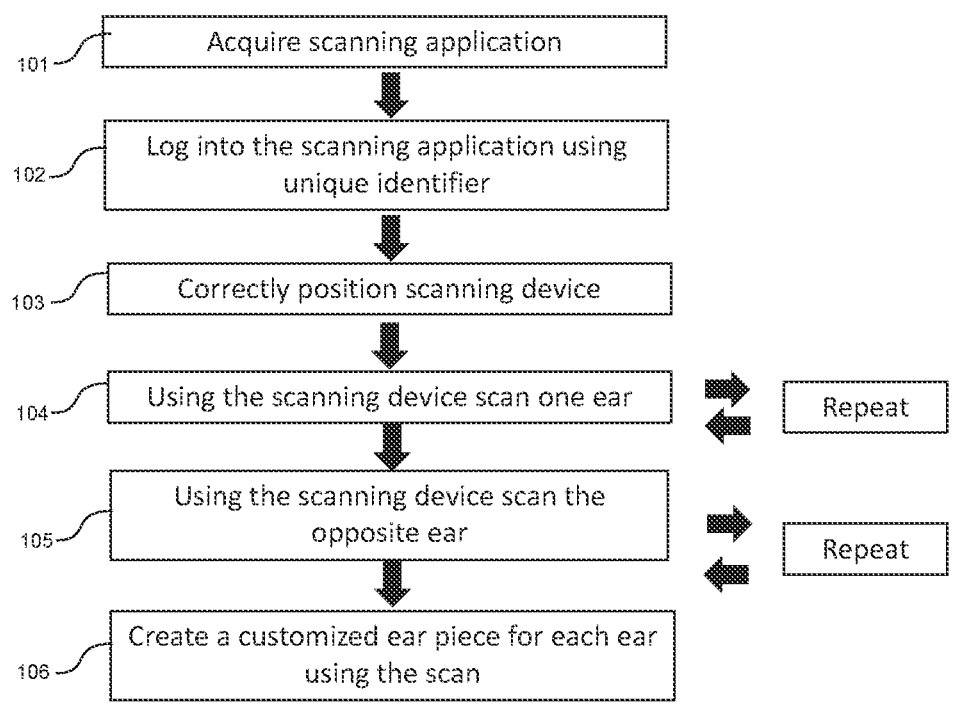
FIG. 2 shows a flowchart detailing the steps of an embodiment of the method for making a customized earpiece.

Referring now to FIG. 2, there is shown a flowchart detailing the steps of an embodiment of the method for making a customized earpiece. Before beginning the scanning process, the system creates the unique identifier associated with the user. The user can then acquire 101 a software application via either the database or some other source, which in conjunction with the camera of the electronic device is utilized to perform the three-dimensional scan. The user can utilize their unique identifier to access or log in 102 to the scanning application.

The user must then correctly position 103 the scanning device, since the method includes scanning an ear of the user with an electronic device that includes at least one camera system that is configured to record a scan comprising a three-dimensional point map. In one embodiment, this step includes positioning the electronic device a threshold distance from the ear. The threshold distance should include a starting position equal to or less than eight inches from the ear, which was determined to be optimal for achieving a detailed and accurate scan. The camera for the electronic device is ideally positioned on the front side of the device that includes the display screen. This allows the user to view their scanned images to verify that they are scanning the ear correctly.

The electronic device is utilized to scan 104 one ear of the user. The scan can include moving the camera slowly around the area of the ear to record a complete image of the ear and its interior. In some embodiments of the method, this step is repeated at least two times, as more scans will generate a more accurate three-dimensional point map. Further, the scanning step may be performed within a threshold time of between fifteen and twenty seconds. This amount of time during the scan ensures that a complete and accurate scan is achieved. This step is repeated for the opposite ear 105 in a similar manner, allowing the user to customize earpieces for both ears.

Utilizing the three-dimensional scan information, a customized earpiece is created 106. The unique identifier is associated with the particular scans so that they are always matched to the user. The method further includes receiving, at a database, the one or more scans via transmission from the electronic device; and receiving, at the database, one or more earpiece parameters via transmission from the electronic device. The parameters include types of earpieces, including earplugs and earbuds, types of internal components such as speaker drivers, and types of materials, such as foam or plastic. All of the materials and components can vary as additional internal components and material types are contemplated, and the present invention is not intended to be limited to particular materials or electronic earbud components that are included. However, the system provides the user with the options to customize these parameters. Coupled with the three-dimensional point map determining the precise size for the earpiece, the method then includes forming, via a three-dimensional printer, a mold having an internal configuration corresponding to the three-dimensional point map and the one or more earpiece parameters. The three-dimensional printer receives instructions via software that converts the point map information to instructional information for the printer. The resulting mold can then be utilized to make an earpiece of the desired material for the user. The earpiece can then be filled with speaker drivers and other components if applicable to the user's selections.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A system for making a customized earpiece, consisting of:
   an portable electronic device adapted for scanning an ear of the user wherein the portable electronic device includes at least one camera system that is configured to record a scan consisting of a three-dimensional point map created at the portable electronic device and to determine the dimensions of the ear at the portable electronic device;
   receiving, at the portable electronic device, the one or more scans;
   receiving, at the portable electronic device, one or more earpiece parameters;
   transmitting, via the portable electronic device, to a three-dimensional printer, the three-dimensional point map and the one or more earpiece parameters;
   wherein the three-dimensional printer is configured to create a mold having an internal configuration corresponding to the three-dimensional point map and the one or more earpiece parameters wherein the mold size varies for different sizes of ears;
   wherein the one or more parameters includes a selection of an earpiece material, one or more speaker driver types;
   wherein the infrared camera is configured to record an image to generate a three- dimensional point map of an object within a recorded area;
   wherein the electronic device reads a resulting pattern from an infrared picture of the user's ear and generates the three-dimensional point map;
   wherein the three-dimensional point map determines the size and appearance of an earpiece mold created by the three-dimensional printer; and,
   wherein the one or more parameters includes a selection of one or more speaker driver types or a selection of an earpiece material.

2. The system of claim 1, wherein the portable electronic device scanning step is repeated at least two times for each ear of the user.

3. The system of claim 1, wherein the portable electronic device scanning step further comprises positioning the electronic device a threshold distance from the user's ear.

4. The system of claim 1, wherein the portable electronic device scanning step includes positioning the electronic device at a starting position equal to or less than eight inches from the user's ear.

5. The system of claim 1, wherein the portable electronic device scanning step is conducted during a threshold of time between fifteen seconds and twenty seconds.

6. The system of Claim 1, wherein the electronic device is a mobile phone.

7. The system of Claim 1, wherein the portable electronic device includes a wireless transceiver in wireless communication with a wireless network.

8. The system of Claim 1, wherein the system for making a customized earpiece is accessible via a cell phone application.

9. The non-transitory computer storage media of claim 1, wherein the portable electronic device comprises a mobile phone that comprises a front side having a display screen and a rear side and the at least one camera system is disposed on the front side of the mobile phone.

10. The non-transitory computer storage media of claim 1, wherein the scanning further comprises positioning the electronic device a threshold distance from the user's ear.

* * * * *